United States Patent
Davis

(10) Patent No.: US 11,225,972 B2
(45) Date of Patent: Jan. 18, 2022

(54) ONE-WAY CLUTCH DRIVE SHAFT COUPLING IN SUBMERSIBLE WELL PUMP ASSEMBLY

(71) Applicant: Baker Hughes Oilfield Operations LLC, Houston, TX (US)

(72) Inventor: Nikolas Davis, Broken Arrow, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 239 days.

(21) Appl. No.: 16/443,046

(22) Filed: Jun. 17, 2019

(65) Prior Publication Data

US 2020/0063541 A1 Feb. 27, 2020

Related U.S. Application Data

(60) Provisional application No. 62/721,349, filed on Aug. 22, 2018.

(51) Int. Cl.
| | | |
|---|---|---|
| *F04D 13/08* | (2006.01) | |
| *E21B 43/12* | (2006.01) | |
| *F16D 41/12* | (2006.01) | |
| *F04D 29/041* | (2006.01) | |

(Continued)

(52) U.S. Cl.
CPC .......... *F04D 13/086* (2013.01); *E21B 43/128* (2013.01); *F04D 13/021* (2013.01); *F04D 29/041* (2013.01); *F04D 29/043* (2013.01); *F16D 41/12* (2013.01)

(58) Field of Classification Search
CPC ........ F04B 13/00; F04B 13/02; F04B 13/021; F04B 13/06; F04B 13/086; F04B 17/00; F04B 17/03; F04B 23/021; F16D 41/07; F16D 41/12; E21B 43/128
See application file for complete search history.

(56) References Cited

U.S. PATENT DOCUMENTS

| | | |
|---|---|---|
| 5,350,242 A | 9/1994 | Wenzel |
| 9,777,540 B2 * | 10/2017 | Downie .................... E21B 4/02 |
| 2002/0056602 A1 | 5/2002 | Aurora |

(Continued)

FOREIGN PATENT DOCUMENTS

WO  2010030272 A1  3/2010

OTHER PUBLICATIONS

International Search Report and Written Opinion for related PCT application PCT/US2019/037602 dated Oct. 2, 2019: pp. 1-9.

*Primary Examiner* — Charles G Freay
*Assistant Examiner* — Chirag Jariwala
(74) *Attorney, Agent, or Firm* — Bracewell LLP; Keith Derrington

(57) ABSTRACT

An electrical submersible pump assembly for pumping well fluid from a well has a motor and a pump. The motor having a motor shaft that drives a pump shaft of the pump. A thrust bearing unit between the motor and the pump has a thrust bearing shaft that rotates a thrust runner in sliding engagement with a non-rotating thrust bearing base. A pump shaft coupling couples the thrust bearing shaft with the pump shaft. A motor shaft coupling couples the thrust bearing shaft with the motor shaft. At least one of the couplings has a one-way clutch that allows forward direction rotation of the thrust bearing shaft and prevents reverse direction rotation.

4 Claims, 5 Drawing Sheets

(51) Int. Cl.
*F04D 29/043* (2006.01)
*F04D 13/02* (2006.01)

(56) References Cited

U.S. PATENT DOCUMENTS

| | | | | |
|---|---|---|---|---|
| 2006/0021841 | A1* | 2/2006 | Kimes | F16D 41/12 |
| | | | | 192/46 |
| 2007/0110593 | A1* | 5/2007 | Sheth | F04D 13/022 |
| | | | | 417/319 |
| 2009/0291001 | A1* | 11/2009 | Neuroth | F04B 17/03 |
| | | | | 417/410.1 |
| 2011/0171047 | A1* | 7/2011 | Parmeter | F04B 47/02 |
| | | | | 417/321 |
| 2015/0275581 | A1 | 10/2015 | Agarwal et al. | |
| 2015/0285319 | A1* | 10/2015 | Kawai | F16D 41/12 |
| | | | | 192/45.1 |

* cited by examiner

ONE-WAY CLUTCH DRIVE SHAFT COUPLING IN SUBMERSIBLE WELL PUMP ASSEMBLY

CROSS REFERENCE TO RELATED APPLICATIONS

This application claims priority to provisional application 62/721,349, filed Aug. 22, 2018.

FIELD OF DISCLOSURE

The present disclosure relates to coupling together drive shafts of modules of a submersible well pump assembly. More specifically, the present disclosure relates to couplings that will selectively transfer torque or ratchet to avoid rotating the thrust bearing in reverse.

BACKGROUND

Electrical submersible pumps (ESP) are commonly used in hydrocarbon producing wells. An ESP includes a pump driven by an electrical motor. A thrust bearing is normally located between the pump and the motor for transferring down thrust imposed on the pump shaft to a housing. The thrust bearing has a thrust runner that operates best while rotated in a normal operating direction. If rotated in reverse, damage to the thrust bearing can occur.

Reverse rotation to the thrust runner can occur in some instances. For example, in some ESP's, when the motor is shut down, the weight of the well fluid in the production tubing can cause the well fluid to flow back down the production tubing, through the pump and out the pump intake. This reverse flow spins the pump shaft in reverse, which in turn would spin the thrust bearing runner in reverse. Also, if the motor shaft is being driven by the pump shaft in reverse, the motor could generate electrical voltage to the surface, which could create problems.

In another instance, the power conductors to the motor may be accidentally reversed during installation, causing the motor to rotate in reverse. This reverse rotation would also spin the thrust bearing runner in reverse.

SUMMARY

An apparatus for pumping well fluid from a well comprises an electrical submersible pump assembly ("ESP") having a motor and a pump, the motor having a motor shaft that drives a pump shaft of the pump. A thrust bearing unit between the motor and the pump has a thrust bearing shaft that rotates a thrust runner in sliding engagement with a non-rotating thrust bearing base. A pump shaft coupling couples the thrust bearing shaft with the pump shaft. A motor shaft coupling couples the thrust bearing shaft with the motor shaft. At least one of the couplings has a one-way clutch that allows forward direction rotation of the thrust bearing shaft and prevents reverse direction rotation.

At least one of the couplings may comprise the pump shaft coupling. At least one of the couplings may comprise the motor shaft coupling. At least one of the couplings may comprise both the pump shaft coupling and the motor shaft coupling.

At least one of the couplings comprises a coupling housing having a coupling housing socket with internal splines. A receptacle in the coupling housing has a receptacle interior wall. A hub is rotatably carried in the receptacle, the hub having a hub socket with internal splines. A one-way clutch is located between the receptacle interior wall and the hub and configured to transfer torque between the hub and the receptacle interior wall while the motor shaft is being driven in the forward direction. The one-way clutch allows relative rotation between the receptacle interior wall and the hub while the motor shaft is not being driven in the forward direction.

The one-way clutch may comprise a plurality of pawls located between the receptacle interior wall and the hub that are configured to transfer torque between the hub and the receptacle interior wall while the motor shaft is being driven in the forward direction. The pawls allow relative rotation between the receptacle interior wall and the hub while the motor shaft is not being driven in the forward direction.

Each of the pawls may be spaced around the hub, each having an inner end in engagement with the hub and an outer end in engagement with the receptacle interior wall. The pawls are configured to transfer forward direction torque between the hub and the receptacle interior wall when the motor shaft is rotating in the forward direction and to allow slippage between the hub and the receptacle interior wall if the motor shaft is not rotating in the forward direction.

Figure 1:
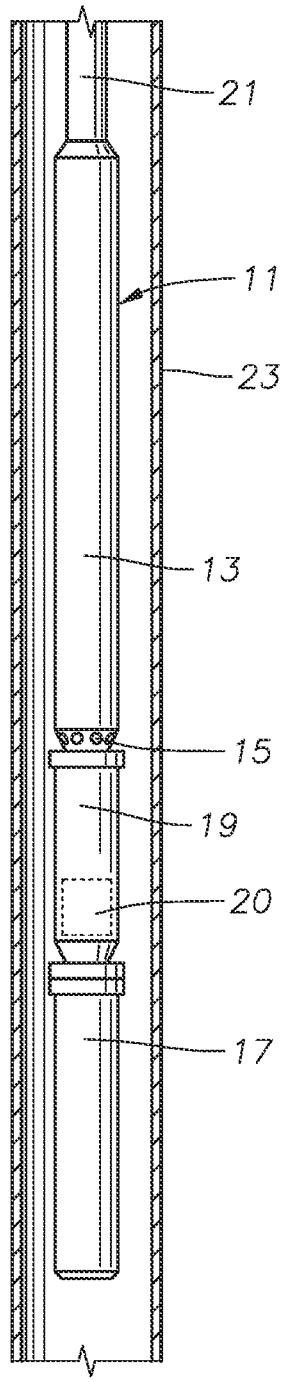
FIG. 1 is a side view of an electrical submersible pump (ESP) having shaft couplings in accordance with this disclosure.

While the disclosure will be described in connection with the preferred embodiments, it will be understood that it is not intended to limit the disclosure to that embodiment. On the contrary, it is intended to cover all alternatives, modifications, and equivalents, as may be included within the scope of the claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about"

includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 illustrates an electrical submersible well pump (ESP) 11 of a type commonly used to lift hydrocarbon production fluids from wells. ESP 11 has a pump 13 that may be a centrifugal, progressing cavity, or other type of rotary pump. Pump 13 has an intake 15 for drawing in well fluid. Intake 15 could in a separate module connected to pump 13. Also, if a rotary gas separator is employed below pump 13, pump intake 15 would be in the gas separator. An electrical motor 17 is operatively mounted to and drives pump 13. Motor 17 contains a dielectric lubricant for lubricating the bearings within. A pressure equalizer or seal section 19 communicates with the lubricant in motor 17 for reducing a pressure differential between the lubricant in motor 17 and the exterior well fluid. In this example, the pressure equalizing portion of seal section 19 locates between motor 17 and pump intake 15. Alternately, the pressure equalizer portion of seal section 19 could be located below motor 17 and other portions of seal section 19 above motor 17. The terms "upward", "downward", "above", "below" and the like are used only for convenience as ESP 11 may be operated in other orientations, such as horizontal.

A thrust bearing assembly 20 is illustrated schematically within a lower portion of seal section 21. Thrust bearing assembly 20 could alternately be a separate module connected between seal section 19 and motor 17. A string of production tubing 21 suspended within casing 23 supports ESP 11. In this example, pump 13 discharges into production tubing 21. Alternately, coiled tubing could support ESP 11, in which case pump 13 would discharge into the annulus around the coiled tubing. The power cable for motor 17 would be within the coiled tubing instead of alongside production tubing 21.

Figure 2:
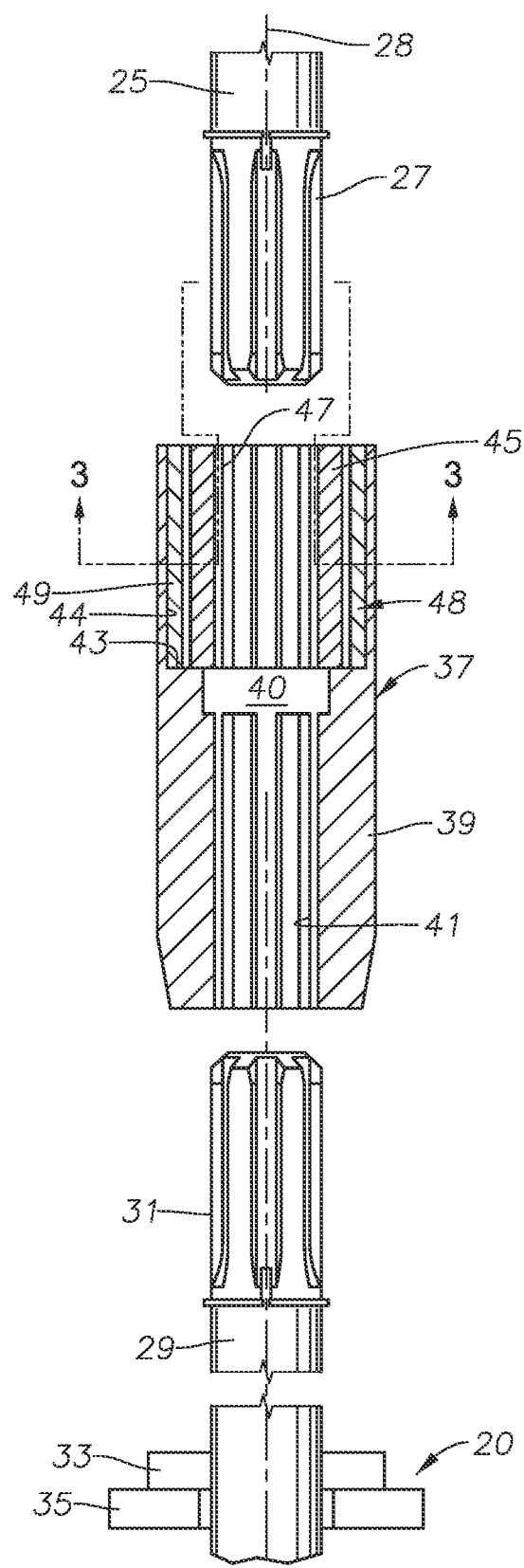
FIG. 2 is an exploded axial sectional view of a drive shaft coupling of the ESP of FIG. 1, shown for connection between a pump drive shaft and a thrust bearing drive shaft.

Referring also to FIG. 2, pump 13 has a rotatable drive shaft 25. If pump 13 is a centrifugal pump having a large number of impellers and diffusers (not shown), pump drive shaft 25 will rotate the impellers. Pump drive shaft 25 may be in sections connected together with splined couplings, particularly if pump intake 15 is in a separate module or if pump intake 15 is part of a gas separator. Pump drive shaft 25 has a lower end with external splines 27 extending axially relative to ESP longitudinal axis 28.

A seal section or thrust bearing drive shaft 29 extends through seal section 19 in this example. Thrust bearing drive shaft 29 could also be in sections coupled together by couplings, particularly if thrust bearing 20 is in a separate module. The upper end of thrust bearing drive shaft 29 has axially extending external splines 31. As shown schematically, thrust bearing assembly 20 includes a thrust runner 33 rigidly connected with thrust bearing drive shaft 29. Thrust runner 33 rotates with thrust bearing drive shaft 29 in sliding engagement with a non-rotating thrust bearing base 35. Thrust bearing base 35 is fixed to the housing of seal section 19 (FIG. 1) in this embodiment. Thrust runner 33 transfers to thrust bearing base 35 down thrust imposed on thrust bearing shaft 29 by pump shaft 25 and pump 13.

In this embodiment, a pump shaft coupling 37 couples pump shaft 25 to thrust bearing shaft 29 and is shown in FIG. 2 separated from engagement with external splines 27, 31 for clarity. Pump shaft coupling 37 has a body or housing 39 with an axial bore 40. Internal housing or fixed splines 41 are integrally formed in a lower or socket portion of bore 40. Housing splines 41 will slide over and mesh with external splines 31 of thrust bearing shaft 29 in a conventional manner in this embodiment.

In this embodiment, housing bore 40 has a larger diameter upper portion that defines a cup-shaped receptacle 43 with a radially inward-facing cylindrical wall 44. A hub 45 locates within receptacle 43. Hub 45 is a tubular member having an inner diameter containing integrally formed hub splines 47. Hub splines 47 will slide axially over and mesh with external splines 27 of pump shaft 25. A ratcheting mechanism or one-way clutch 48 locates between the exterior of hub 45 and the interior wall 44 of receptacle 43. One-way clutch 48 may have a variety of configurations.

Pump shaft coupling 37 will automatically transfer torque from thrust bearing shaft 29 to pump shaft 25 when the torque imposed on thrust bearing shaft 29 by motor 17 (FIG. 1) is in a normal operating direction. One-way clutch 48 will automatically ratchet and not transfer torque from pump shaft 25 to thrust bearing shaft 29 if pump shaft 25 is being driven in reverse. Reverse spinning of pump shaft 25 may occur when motor 17 is shut off and well fluid in production tubing 21 (FIG. 1) flows downward through pump 13 and out pump intake 15. In that event, the pump stages cause pump shaft 25 to rotate in reverse. As a result, the reverse spinning of pump shaft 25 automatically spins hub 45 in housing 39.

Because of one-way clutch 48, coupling housing 39 does not rotate with hub 45 during reverse spinning of pump shaft 25. As a result, thrust bearing runner 33 will not rotate in reverse, which can cause damage to thrust bearing 20. One-way clutch 48, the interior of receptacle 43, and the exterior of hub 45 may be configured in a variety of ways in order to accomplish the ratcheting action described. Also, one-way clutch 48 may be configured to enable pump shaft coupling 39 to be inverted, with internal splines 41 engaging pump shaft splines 27.

Figure 3:
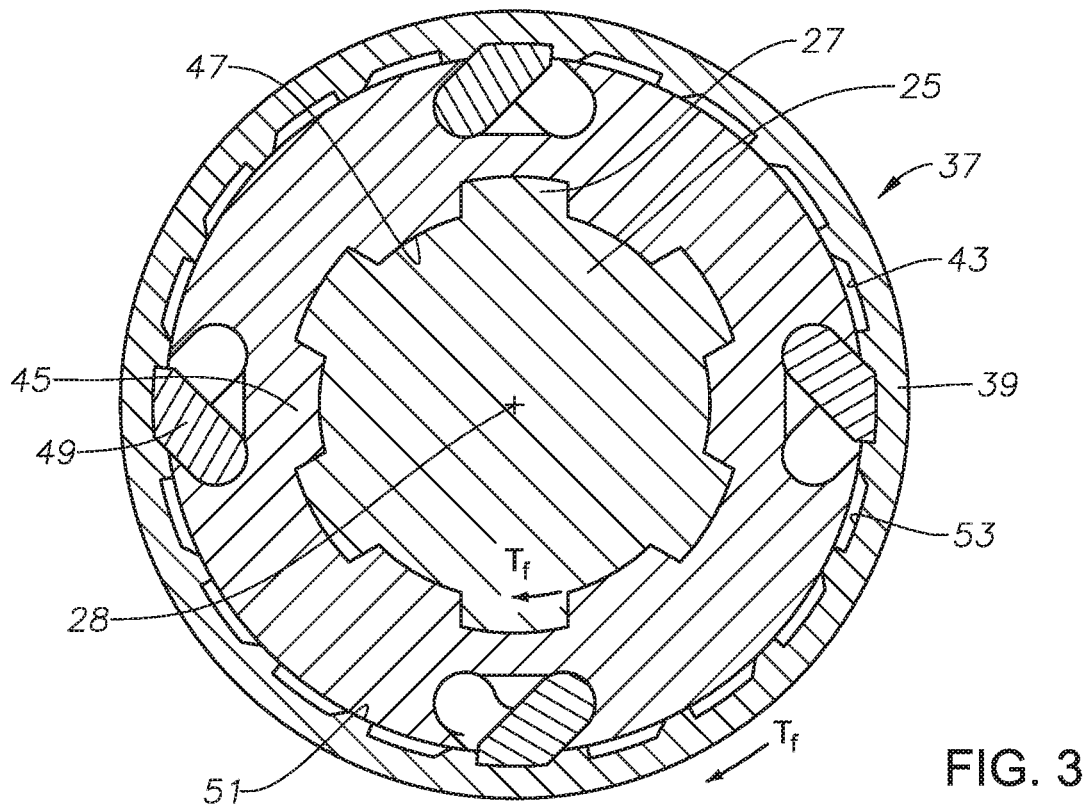
FIG. 3 is a transverse sectional view of the coupling of FIG. 2, taken along the line 3-3 of FIG. 2, with the coupling in a torque transmitting position.
Figure 4:
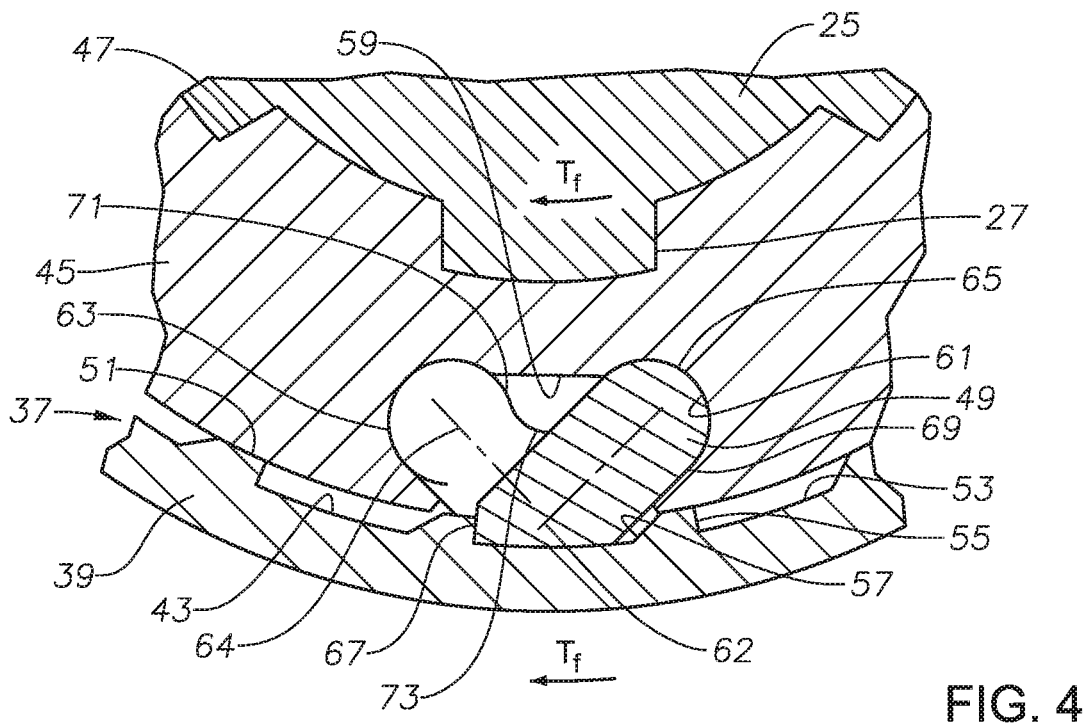
FIG. 4 is a partial, enlarged sectional view of coupling as shown in FIG. 3.

FIGS. 3 and 4 illustrate one embodiment of the one-way clutch 48 of pump shaft coupling 37, shown when pump shaft coupling 37 is a torque transferring mode caused by motor 17 (FIG. 1) driving thrust bearing drive shaft 29 (FIG. 2). One-way clutch 48 in this embodiment has pivotal pawls 49 spaced circumferentially around hub 45. Interior wall 44 of housing receptacle 43 has an inward-facing circumferential engagement surface comprising circumferentially spaced teeth 51 separated by valleys 53. Teeth 51 may extend axially from the top of housing 39 to the lower end of receptacle 43 (FIG. 2). Each tooth 51 has a load shoulder 55 that is generally along a radial line of axis 28. Each tooth 51 has a ramp 57 on its opposite circumferential side. Ramp 57 inclines at an angle relative to a radial line of axis 28.

The exterior of hub 45 has an outward-facing circumferential engagement surface comprising circumferentially spaced apart slots or recesses 59. Each recess 59 extends from the lower to the upper end of hub 45. Each recess 59 has a first curved portion 61 that faces outward along an oblique center line 62. Each recess 59 has a second curved portion 63 that faces outward along an oblique center line 64. Center lines 62, 64 intersect each other approximately at the outer diameter of hub 45.

Each pawl 49 has a curved inner end 65 that mates with recess first curved portion 61. Each pawl 47 has a flat load shoulder 67 that abuts tooth load shoulder 55 while pump shaft coupling 37 is in the torque transferring mode. Each pawl 49 has side edges 69 that are parallel to recess center line 62 while pump shaft coupling 37 is in the torque transferring mode. A spring 71 has a curved outer portion that fits within recess second curved portion 63. Spring 71 has one leg with a tip 73 that contacts one of the pawl sides 69, urging pawl 49 to remain in the torque transferring position of FIGS. 3 and 4.

The torque transferring mode Tf automatically occurs when motor 17 (FIG. 1) rotates thrust bearing shaft 29 in the normal operational or forward direction. This rotation causes coupling housing 39 to rotate in the forward direction indicated by the arrow Tf in FIG. 3. The forces imposed by the abutment of tooth load shoulders 55 against pawl load shoulders 67 transfer through pawls 49 to hub recess curved ends 61, causing hub 45 to rotate in unison with housing 39. The engagement of hub splines 47 with pump shaft splines 27 causes pump shaft 25 to rotate in the forward direction in unison. The forward direction torque Tf imposed by motor 17 will drive pump 13.

Figure 5:
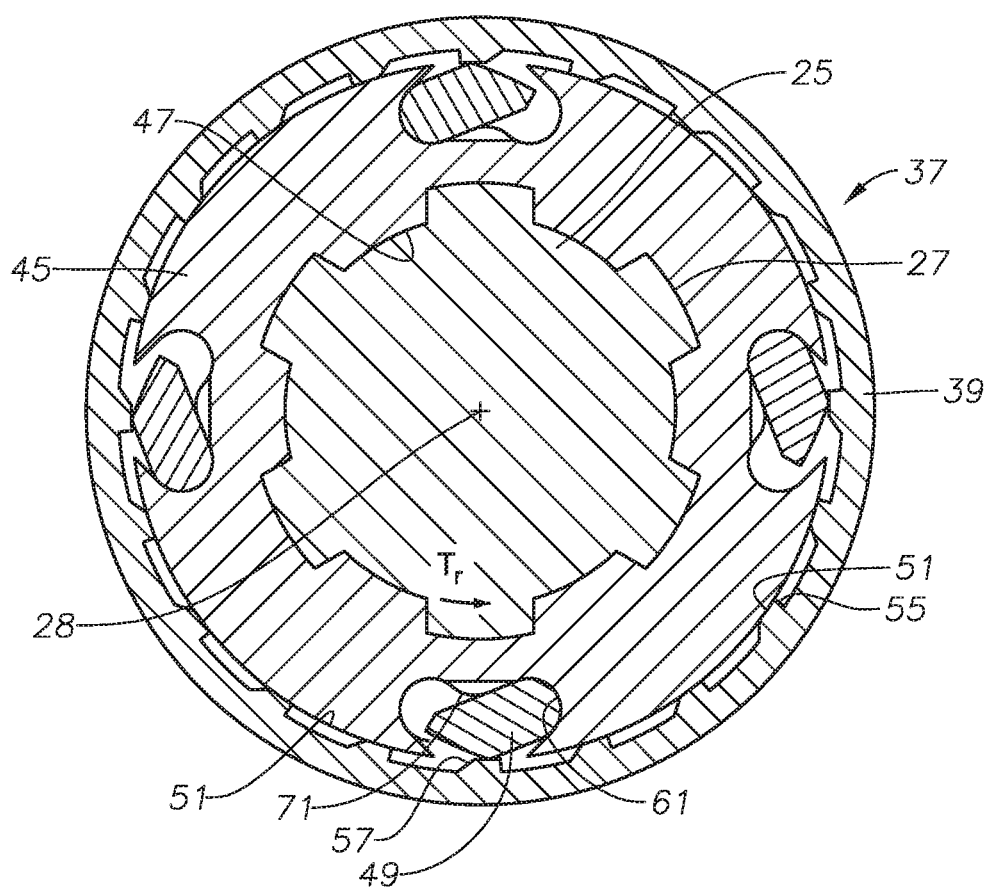
FIG. 5 is a transverse sectional view of the coupling as shown in FIG. 2, but with the coupling in a ratcheting position.

FIG. 5 illustrates pump shaft coupling 37 while one-way clutch 48 is in a ratcheting, non-torque transferring mode. In this mode, motor 17 is no longer applying torque to cause thrust bearing shaft 29 to rotate in the forward direction. This instance may occur when motor 17 gets turned off. The well fluid previously pumped up production tubing 21 (FIG. 1) by pump 13 begins to flow downward, causing pump shaft 25 to rotate in reverse, as indicated by the arrow Tr. The meshing engagement of pump shaft splines 27 with hub splines 47 causes reverse rotation of hub 45. Springs 71 maintain pawls 49 in engagement with recess curved portions 61, but allow them to pivot. Referring also to FIG. 4, pawls 49 will slide or ratchet over ramps 57, pivoting inward and outward. Pawls 49 do not transfer reverse torque Tr to load shoulders 67, consequently housing 39 does not rotate in reverse with pump shaft 29.

Referring again to FIG. 2, thrust bearing shaft 29 and runner 33 will not rotate in reverse with pump shaft 25, avoiding damage that could occur to thrust bearing 20. Without reverse torque Tr being applied, the frictional engagement of thrust runner 33 with thrust bearing base 35 may be sufficient to prevent reverse rotation of thrust runner 33 on thrust bearing base 35.

Figure 6:
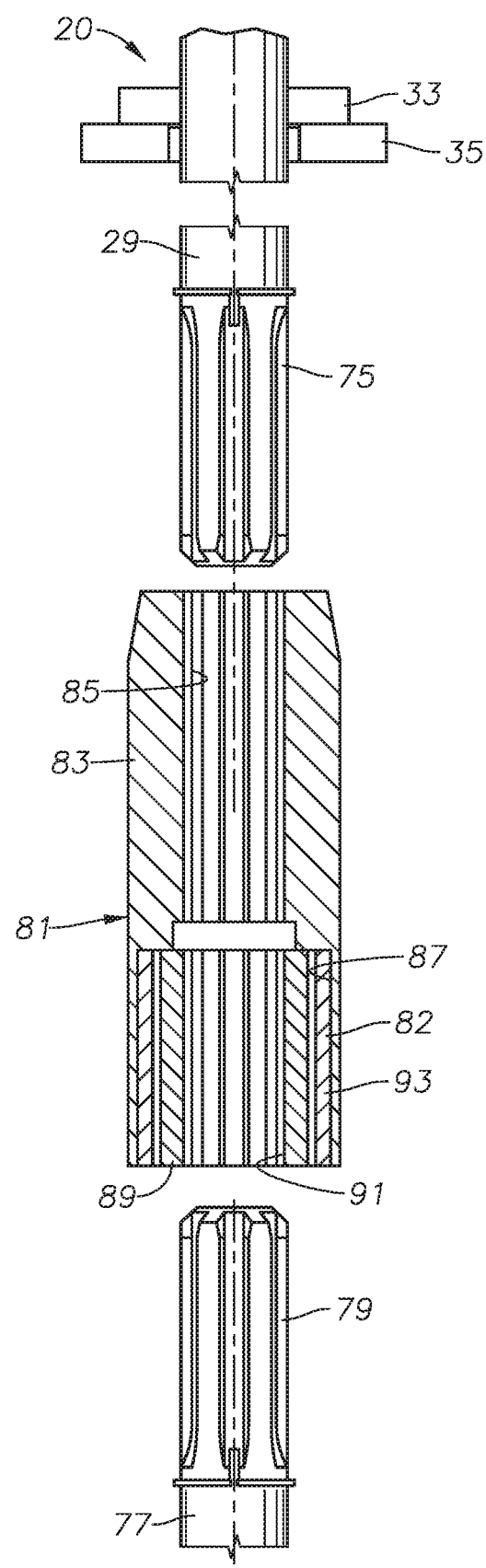
FIG. 6 is an exploded axial sectional view of another of the drive shaft couplings of the ESP of FIG. 1, shown for connection between the thrust bearing drive shaft and a motor drive shaft.

FIG. 6 illustrates a lower end of thrust bearing shaft 29 extending below thrust bearing 20. External splines 75 are formed on the lower end of thrust bearing shaft 29. The upper end of a motor shaft 77 is axially aligned with the lower end of thrust bearing shaft 29 and has external splines 79. A motor shaft coupling 81 couples motor shaft external splines 79 with thrust bearing shaft external splines 75. Motor shaft coupling 81 may also have a one-way clutch 82 configured to prevent reverse rotation of thrust bearing shaft 29 in the event motor shaft 77 is being driven in reverse. This instance may occur due to a mistake made by technicians during the installation of ESP 11.

In this example, motor shaft coupling 81 is the same as pump shaft coupling 37 (FIG. 2) but inverted. Motor shaft coupling 81 has a housing 83 that has housing internal or fixed splines 85 on its upper portion to mesh with thrust bearing shaft external splines 75. Housing 83 has a receptacle 87 in its lower portion that receives a hub 89. Hub 89 has hub splines 91 that mesh with motor shaft external splines 79 in this example. One-way clutch 82 may be configured the same as one-way clutch 48 (FIG. 2) with pawls 93 located between the outward facing engagement surface of hub 89 and inward facing engagement surface of receptacle 87. Motor shaft coupling 81 could be inverted with one-way clutch 48 configured to operate to prevent reverse torque from being applied to thrust bearing shaft 29.

When motor 17 (FIG. 1) rotates motor shaft 77 in the normal operational direction, one-way clutch 82 will automatically be in a torque transferring position to transfer torque from hub 89 to housing 83. Housing 83, in turn, transfers torque to thrust bearing shaft 29 and runner 33. Pump shaft coupling 37 (FIG. 2) transfers the operational direction torque to pump shaft 25.

If motor 17 is inadvertently rotating in a reverse direction, one-way clutch 82 will now automatically be in a ratcheting mode, allowing hub 89 to spin and not transfer reverse torque to housing 83. As a result, thrust bearing shaft 29 and thrust runner 35 will not rotate in reverse.

Figure 7:
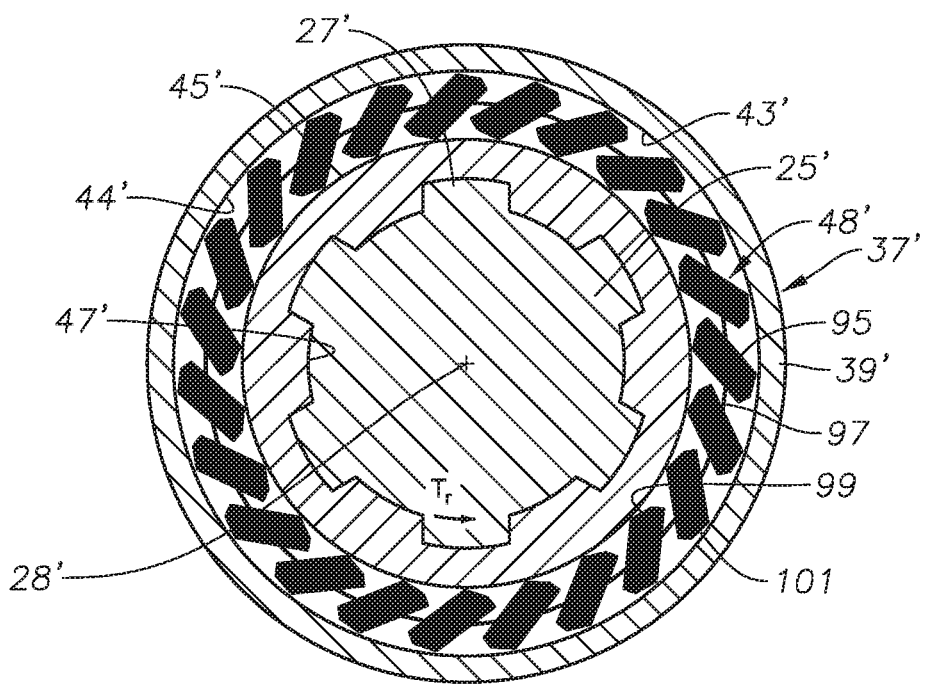
FIG. 7 is a schematic transverse sectional view of an alternate embodiment of a coupling in a ratcheting position.
Figure 8:
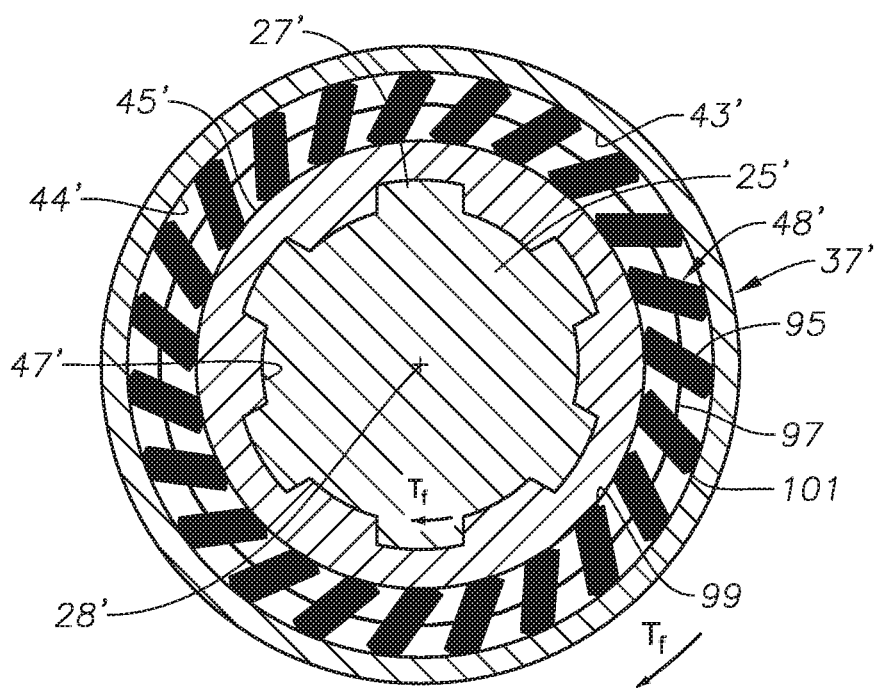
FIG. 8 is a view similar to FIG. 7, but showing the coupling in a torque transmitting position.

FIGS. 7 and 8 schematically illustrate an alternate embodiment of a one-way clutch 48'. FIGS. 7 and 8 are illustrated as being on the same section line 3-3 of pump shaft coupling 37 of FIG. 2, the reference numerals for similar components are the same except for a prime symbol. FIGS. 7 and 8 may also illustrate motor shaft coupling 81 (FIG. 6). As in the first embodiment, pump shaft coupling 37' has a coupling housing 39' with a receptacle 43' having an interior, inward-facing wall 44'. A hub 45' is carried in receptacle 43'. Hub 45' has hub splines 47' that are in meshing engagement with the splines on the lower end of pump shaft 25'.

One-way clutch 48' in FIGS. 7 and 8 comprises pawls 95 positioned around the annular space between hub 45' and interior wall 44' of receptacle 43'. Pawls 95 may be rectangular or have other shapes, and are retained by a retainer 97 at pivotal inclinations relative to radial lines from axis 28'. Retainer 97 may be a spring. Each pawl 95 has an inner end 99 in frictional engagement with the outer cylindrical side of hub 45'. Each pawl 95 has an outer end 101 in frictional engagement with interior wall 44' of receptacle 43'.

During normal operation of the pump motor 17 as shown in FIG. 8, receptacle 43' and hub 45' will be rotating in a forward direction Tf because of its engagement with thrust bearing shaft 29 (FIG. 2). Pawls 95 will transfer the torque from receptacle 43' to hub 45', causing pump shaft 25' to rotate in the forward direction Tf.

If motor 17 (FIG. 1) ceases operating, it will cease to apply forward direction torque Tf to motor shaft 77 (FIG. 6) and thrust bearing shaft 29 (FIG. 2). Well fluid in production tubing 21 (FIG. 1) may start falling back downward through pump 13, causing pump shaft 25' to spin in the reverse direction, applying reverse direction torque Tr, as shown in FIG. 7. Pawls 95 will slide along the interior wall of receptacle 43' and not transmit the reverse direction torque Tr from hub 45' to receptacle 43. As a result, thrust bearing shaft 29 (FIG. 2) will not turn in the reverse direction. Motor shaft coupling 81 (FIG. 6) could also contain the same one-way clutch as one-wavy clutch 48'.

The present disclosure described herein, therefore, is well adapted to carry out the objects and attain the ends and advantages mentioned, as well as others inherent therein. While only two embodiments of the disclosure have been given for purposes of disclosure, numerous changes exist in the details of procedures for accomplishing the desired results. These and other similar modifications will readily suggest themselves to those skilled in the art, and are intended to be encompassed within the scope of the appended claims. For example, an operator may choose to have only one of the ratcheting couplings, such as pump shaft coupling 37 or motor shaft coupling 81, rather than both.

The invention claimed is:

1. An apparatus for pumping well fluid from a well, comprising:
an electrical submersible pump assembly having a motor and a pump, the motor having a motor shaft that drives a pump shaft of the pump;
the motor shaft having an upper end with external splines;
the pump shaft having a lower end with external splines;
a thrust bearing unit between the motor and the pump, the thrust bearing unit having a thrust bearing shaft that rotates a thrust runner in sliding engagement with a non-rotating thrust bearing base, the thrust bearing shaft having upper and lower ends, each having external splines;
a pump shaft coupling that couples the upper end of the thrust bearing shaft with the lower end of the pump shaft;
a motor shaft coupling that couples the lower end of the thrust bearing shaft with the upper end of the motor shaft;
wherein the pump shaft coupling comprises:
a coupling housing having a coupling housing socket extending into the coupling housing from a first end, the socket having a set of internal splines that mesh with the external splines on either the lower end of the pump shaft or the upper end of the thrust bearing shaft;
a receptacle in a second end of the coupling housing, the receptacle having a receptacle interior wall;
a hub carried in the receptacle for rotation relative to the coupling housing, the hub having a set of internal splines that mesh with the external splines on other of the lower end of the pump shaft or the upper end of the thrust bearing shaft;
a one-way clutch located between the receptacle interior wall and the hub to transfer torque between the hub and the receptacle interior wall while the motor shaft is being driven in a forward direction, and to allow relative rotation between the receptacle interior wall and the hub while the pump shaft is rotating in a reverse direction and the motor is shut off, thereby preventing reverse rotation of the thrust bearing shaft; and wherein
the pump shaft coupling is configured to transfer down thrust on the pump shaft to the thrust bearing shaft.

2. The apparatus according to claim 1, wherein the one way clutch comprises:
a plurality of pawls spaced around the hub, each having an inner end in engagement with the hub and an outer end in engagement with the receptacle interior wall, the pawls being configured to transfer forward direction torque between the hub and the receptacle interior wall when the motor shaft is rotating in the forward direction, and the pawls being configured to allow slippage between the hub and the receptacle interior wall while the motor shaft is not rotating in the forward direction.

3. The apparatus according to claim 1, wherein the motor shaft coupling comprises:
a motor coupling housing having a motor coupling housing socket extending into the motor coupling housing from a first end, the motor coupling housing socket having a set of internal splines that mesh with the external splines on either the upper end of the motor shaft or the lower end of the thrust bearing shaft;
a motor coupling receptacle in a second end of the motor coupling housing, the motor coupling receptacle having a motor coupling receptacle interior wall;
a motor coupling hub carried in the motor coupling receptacle for rotation relative to the motor coupling housing, the motor coupling hub having a set of internal splines that mesh with the external splines on other of the upper end of the motor shaft or the lower end of the thrust bearing shaft; and
a motor coupling one-way clutch located between the motor coupling receptacle interior wall and the motor coupling hub to transfer torque between the motor coupling hub and the motor coupling receptacle interior wall while the motor shaft is being driven in a forward direction, and to allow relative rotation between the motor coupling receptacle interior wall and the motor coupling hub while the motor shaft is being driven by the motor in a reverse direction.

4. An apparatus for pumping well fluid from a well, comprising:
an electrical submersible pump assembly having a motor and a pump, the motor having a motor shaft that drives a pump shaft of the pump;
the motor shaft having an upper end with external splines;
the pump shaft having a lower end with external splines;
a thrust bearing unit between the motor and the pump, the thrust bearing unit having a thrust bearing shaft that rotates a thrust runner in sliding engagement with a non-rotating thrust bearing base, the thrust bearing shaft having upper and lower ends, each having external splines;
a pump shaft coupling that couples the upper end of the thrust bearing shaft with the lower end of the pump shaft;
a motor shaft coupling that couples the thrust bearing shaft with the motor shaft, the motor shaft coupling comprising:
a motor coupling housing having a motor coupling housing socket extending into the motor coupling housing from a first end, the motor coupling housing socket having a set of internal splines that mesh with the external splines on either the upper end of the motor shaft or the lower end of the thrust bearing shaft;
a motor coupling receptacle in a second end of the motor coupling housing, the motor coupling receptacle having a motor coupling receptacle interior wall;
a motor coupling hub carried in the motor coupling receptacle for rotation relative to the motor coupling housing, the motor coupling hub having a set of internal splines that mesh with the external splines on other of the upper end of the motor shaft or the lower end of the thrust bearing shaft; and
a motor coupling one-way clutch located between the motor coupling receptacle interior wall and the motor coupling hub to transfer torque between the motor coupling hub and the motor coupling receptacle interior wall while the motor shaft is being driven in a forward direction, and to allow relative rotation between the motor coupling receptacle interior wall and the motor coupling hub while the motor shaft is being driven by the motor in a reverse direction.

* * * * *